United States Patent
Böhnke et al.

(10) Patent No.: US 6,738,443 B1
(45) Date of Patent: May 18, 2004

(54) OPTIMIZED SYNCHRONIZATION PREAMBLE STRUCTURE

(75) Inventors: Ralf Böhnke, Esslingen (DE); Thomas Dölle, Stuttgart (DE); Tino Konschak, Stuttgart (DE)

(73) Assignee: Sony International (Europe) GmbH, Berlin (DE)

( * ) Notice: Subject to any disclaimer, the term of this patent is extended or adjusted under 35 U.S.C. 154(b) by 577 days.

(21) Appl. No.: 09/594,434

(22) Filed: Jun. 14, 2000

(30) Foreign Application Priority Data

Jun. 16, 1999  (EP) ............................................ 99111684

(51) Int. Cl.$^7$ ................................................ H04L 7/06
(52) U.S. Cl. ........................ 375/364; 375/368; 375/343; 370/514
(58) Field of Search ................................. 375/364, 362, 375/365, 366, 368, 343; 370/509, 510, 511, 512, 513, 514

(56) References Cited

U.S. PATENT DOCUMENTS

| | | | |
|---|---|---|---|
| 5,450,456 A | | 9/1995 | Mueller |
| 5,991,289 A | * | 11/1999 | Huang et al. ............... 370/350 |
| 6,172,993 B1 | * | 1/2001 | Kim et al. .................... 370/516 |
| 6,304,611 B1 | * | 10/2001 | Miyashita et al. .......... 375/260 |
| 6,381,251 B1 | * | 4/2002 | Sano et al. .................. 370/480 |
| 6,424,678 B1 | * | 7/2002 | Doberstein et al. ......... 375/260 |
| 6,459,679 B1 | * | 10/2002 | Kim ........................... 370/208 |
| 6,549,592 B1 | * | 4/2003 | Jones ......................... 375/354 |

FOREIGN PATENT DOCUMENTS

| | | |
|---|---|---|
| EP | 0 828 365 | 3/1998 |
| EP | 0 901 256 | 3/1999 |
| EP | 1 018 827 | 7/2000 |
| GB | 2 320 868 | 7/1998 |
| WO | WO 98 00946 | 1/1998 |

OTHER PUBLICATIONS

Schmidl T M et al: "Low–Overhead, Low Complexity Burst Synchronization for OFDM" 1996 IEEE International Conference on Communications, Converging Technologies for Tomorrow's Applications Dallas, Jun. 23–27, 1996, vol. 3, Jun. 23, 1996 pp. 1301–1306, XP000625022.

Mizoguchi M et al: "A Fast Burst Synchronization Scheme for OFDM" ICUPC '98. IEEE 1998 International Conference on Universal Personal Communications. Conference Proceedings, ICUPC '98. IEEE 1998 International Conference on Universal Personal Communications. Conference Proceedings, Florence, Italy, pp. 125–129, vol. 1, XP002121851.

(List continued on next page.)

Primary Examiner—Phoung Phu
(74) Attorney, Agent, or Firm—Frommer Lawrence & Haug LLP; William S. Frommer; Darren M. Simon (57) ABSTRACT

This proposal describes an optimized synchronization (SYNCH) symbol sequence to be used in transmission systems, which are currently under standardization. The synchronization symbol is constructed using specially designed OFDM (orthogonal frequency division multiplexing) symbols with an optimized sequence, which is mapped onto the modulated subcarriers. The resulting synchronization symbol consists of several repetitions in the time domain. Using the proposed sequence the resulting synchronization symbol achieves a high timing detection and frequency offset estimation accuracy. Furthermore the burst is optimized to achieve a very low envelope fluctuation (low Peak-to-Average Power Ratio) and a very low dynamic range to reduce complexity on the receiver and to save time and frequency acquisition time in the receiver. The proposed sequence is furthermore optimized with respect to all other synchronization symbols that are used to construct the synchronization and training preambles for the BCCH-DLCHs.

2 Claims, 5 Drawing Sheets

OTHER PUBLICATIONS

Lambrette U et al: "OFDM Burst Frequency Synchronization by Single Carrier Training Data" IEEE Communications Letters, vol. 1, No. 2, Mar. 1, 1997, pp. 46–48, XP000687090.

Dinis R et al: "Carrier Synchronization with CEPB–OFDM" 1997 IEEE 47th. Vehicular Technology Conference, Phoenix, May 4–7, 1997, vol. 3, No. Conf. 47, May 4, 1997, pp. 1370–1374, XP000738586.

* cited by examiner

FIG 1

PRIOR ART

PRIOR ART

FIG 4

PRIOR ART

PRIOR ART

OPTIMIZED SYNCHRONIZATION PREAMBLE STRUCTURE

FIELD OF THE INVENTION

The present invention relates to a preamble structure for the synchronization of a receiver of a OFDM transmission. The invention furthermore relates to an OFDM transmitter as well as to a method for the synchronization of a receiver of an OFDM transmission system.

BACKGROUND OF THE INVENTION

Figure 2:
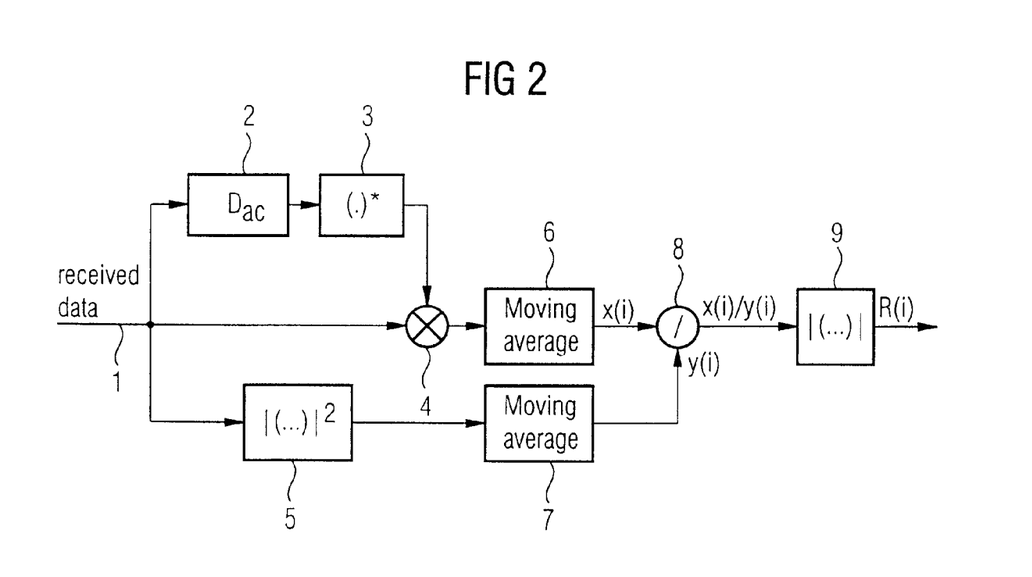
FIG. 2 shows the general concept of an auto-correlation technique.

With reference to FIG. 2 now an autocorrelation technique on the receiving side of an OFDM system will be explained. The received signal is delayed by a delaying unit 2 by the correlation delay $D_{ac}$. The conjugate complex samples of the delayed version of the signals are generated 3 and multiplied 4 with the received samples. The products are set into the moving average unit 6 with a window size $W_{ac}$ and are then postprocessed for a threshold detection and/or maximum search (units 5, 7, 8) to find the correct timing. The complex correlation result at the peak possession generated by the unit 9 can be used to estimate the frequency offset.

Figure 1:
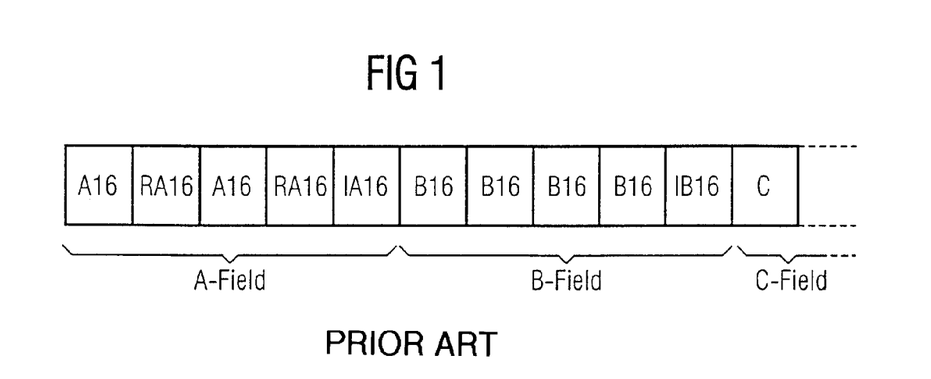
FIG. 1 shows the general structure of a known synchronization preamble.

A synchronization preamble structure as shown in FIG. 1 is known. This known synchronization preamble structure can be subdivided in a A-FIELD, B-FIELD and a C-FIELD. The A-FIELD and the B-FIELD are subdivided in further parts. Each of the A-FIELD and the B-FIELD and the C-FIELD is designed to have an optimized special synchronization function at the receiving side. The A-FIELD for example serves for a coarse frame detection and an automatic gain control (AGC). The B-FIELD serves as a coarse frequency offset and timing synchronization. The C-FIELD serves for a channel estimation and fine synchronization.

Details about the concrete structure and generation of the B-FIELD can be found in the European patent application 99 103 379.6 in the name of Sony International (Europe) GmbH, which is to be regarded as representing prior art according to article 54(3) EPC. Regarding the details of the B-FIELD and generally the generation of the time domain synchronization preamble signal as shown in FIG. 1 reference is made to said prior non-prepublished application.

The symbols of the C-FIELD, which is generally of minor interest for the present invention, are defined in frequency domain as $C64_{-26 \ldots 26}$={1,1,−1,−1,1,1,−1,1,−1,1,1,1,1,1,1,−1,−1, 1,−1,1,1,−1,1,1,1,1,0, 1,−1,−1,1,1,−1,1,−1,1,−1,1,− 1,−1,−1,1,1,−1,−1,1,−1,1,−1,1,1,1,1}

The symbols B16 of the B-FIELD are short OFDM symbols, of which the subcarriers +−4, +−8, +−12, +−16, +−20, +−24 are modulated.

The content in the frequency domain is defined as:

$B16_{-26 \ldots 26}$=sqrt(2)*{0,0,1+j,0,0,0,−1+j,0,0,0,−1−j,0,0, 0,1−j,0,0,0,0,−1−j,0,0,0,1−j,0,0,0,0,0,0,0,1−j,0,0,0,−1−j, 0,0,0,1−j,0,0,0,−1−j,0,0,0,−1+j,0,0,0,1+j,0,0}

The last repetition of the B-FIELD in the time domain, called IB16, is a sign inverted copy of the preceding B16.

The symbols A16 are short OFDM symbols, of which the subcarriers +−2, +−6, +−10, +−14, +−18, +−22, are modulated. The content in the frequency domain is defined as:

$A_{-26 \ldots 26}$=0,0,0,+1−j,0,0,0,+1+j,0,0,0,−1+j,0,0,0,−1−j,0, 0,0,+1−j,0,0,0,−1−j,0,0,0,+1−j,0,0,0,−1−j,0,0,0,+1−j,0, 0,0,−1−j,0,0,0,−1+j,0,0,0,+1+j,0,0,0,0}

The sign reversal of every second A16 symbol in the time domain is automatically achieved by the specified subcarrier loading. The last repetition of the A-FIELD in time domain, called IA16, is a copy of the preceding RA16.

Figure 3:
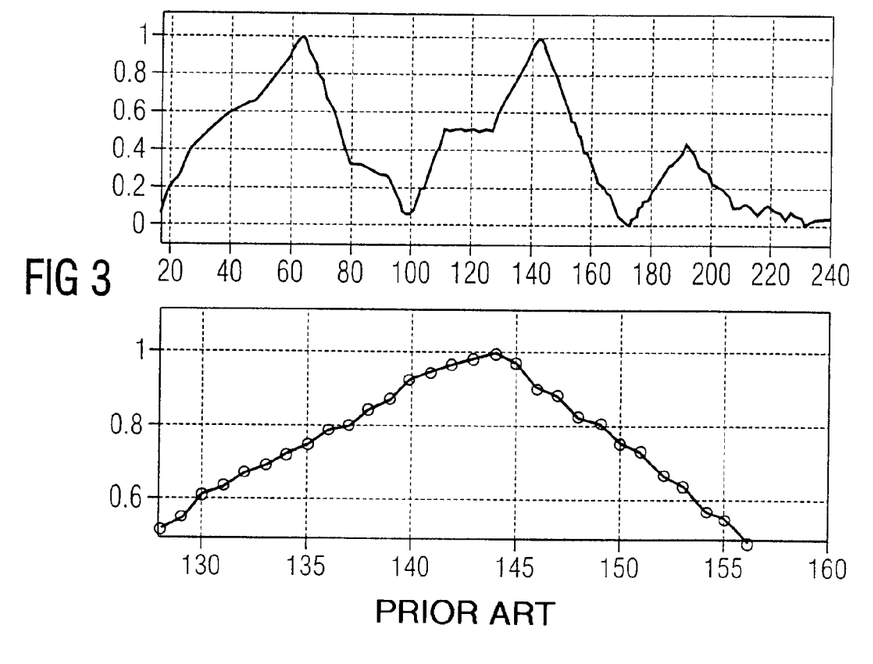
FIG. 3 shows a correlation result achieved with sequences according to the prior art.

An optimized matching between A and B-FIELD of the BCCH preamble is achieved as shown in FIG. 3 and thus the timing accuracy improvement, which is basically achieved through the specified time domain structure, is kept. Two clear single AC amplitude peaks can be identified in the BCCH preamble. Additionally a tow plateau in front of the second AC peak can be seen, which is advantageous for receiver synchronization processing (e.g. used as threshold to invoke correlation peak search algorithm).

In the last time a new B-FIELD was proposed. In the following this new B-FIELD will be explained.

The symbols B16 according to this new B-field are short OFDM symbols, of which the subcarriers +−4, +−8, +−12, +−16, +−20, +−24 are modulated.

$B16_{-26 \ldots 26}$=sqrt(2)*{0,0,1+j,0,0,0,−1−j,0,0,0,1+j,0,0, 0,−1−j,0,0,0,−1−j,0,0,0,1+j,0,0,0,0,0,0,0,−1−j,0,0,0,− 1−j,0,0,0,1+j,0,0,0,1+j,0,0,0,1+j,0,0,0,1+j,0,0}

This new B-field results in improved performance when using cross-correlation based receivers due to lower cross-correlation sidelobes at the border from the B-FIELD to the C-FIELD.

The short OFDM symbols, consisting of 12 modulated subcarriers are phase modulated by the elements of the symbol alphabet $S=\sqrt{2}(\pm 1 \pm j)$. The C-FIELD symbols are not considered here.

The generalized mapping for field B is:

$S_{-26,26}$=sqrt(2)*{0,0,S1,0,0,0,S2,0,0,0,S3,0,0,0,S4,0,0,0, S5,0,0,0,S6,0,0,0,0,0,0,0,S7,0,0,0,S8,0,0,0,S9,0,0,0, S10,0,0,0,S11,0,0,0,S12,0,0} where 'sqrt(2)' is used to normalize the power. Applying a 64-point IFFT to the vector S, where the remaining 15 values are set to zero 'four' short training symbols can be generated. The IFFT output is cyclically extended to result in the dedicated number of short symbols.

The generalized mapping for field A is:

$S_{-26,26}$=sqrt(2)*{0,0,0,0,S1,0,0,0,S2,0,0,0,S3,0,0,0,S4,0, 0,0,S5,0,0,0,S6,0,0,0,S7,0,0,0,S8,0,0,0,S9,0,0,0,S10,0, 0,0,S11,0,0,0,S12,0,0,0,0}

Where 'sqrt(2)' is used to normalize the power. Applying a 64-point IFFT to the vector S, where the remaining 15 values are set to zero 'four' short training symbols can be generated. The IFFT output is cyclically extended to result in the dedicated number of short symbols.

The currently specified sequence for field A is:

S1 ... 12=(+1−j), (+1+j), (−1+j), (−1−j), (+1−j), (−1−j), (+1−j), (−1−j), (+1−j), (−1−j), (−1+j), (+1+j)

Using the new B-FIELD no optimization has been made in the A-FIELD in order to improve auto-correlation based receiver synchronization.

Figure 4:
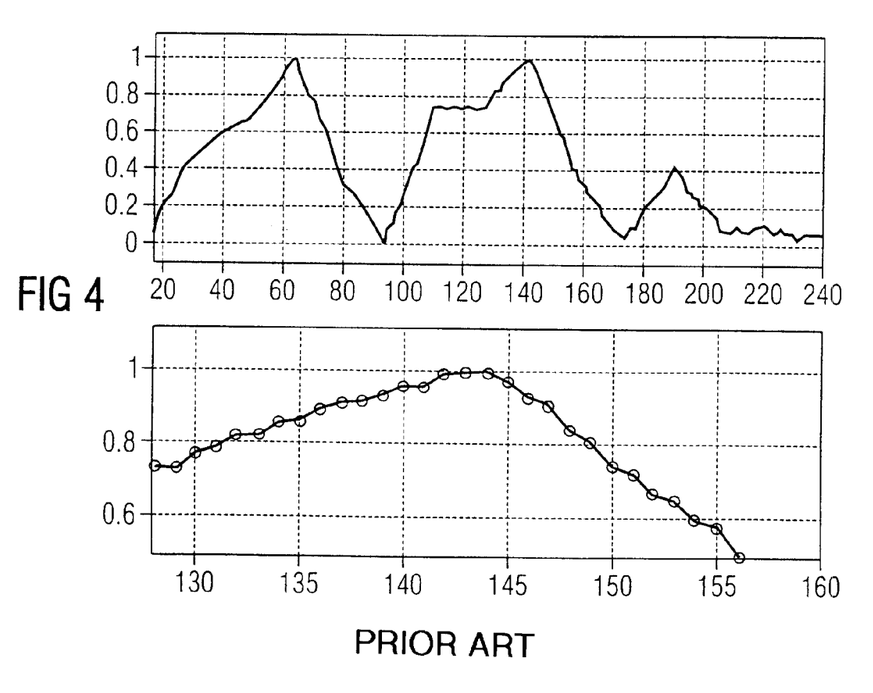
FIG. 4 shows an auto-correlation result achieved when using the latest proposed B-FIELD sequence in combination with the A-FIELD sequence according to the prior art.

FIG. 4 shows the ideal AC result (amplitude and phase) using a BCCH preamble structure with unmodified A-FIELD, C-FIELD and the new (modified) B-FIELD based on the B16 sequence proposed. The AC result is used to identify a frame start, adjust the AGC and to do timing and frequency synchronization. Especially the B-FIELD can be used for the later synchronization tasks. It is very important to achieve time synchronization as accurate as possible. With the configuration described two auto-correlation peaks (A-FIELD, modified B-FIELD) are visible, however, the slopes on both sides of the B-FIELD peak are very different (steep gradient on the right, shallow gradient on the left), this effect decreases the synchronization accuracy significantly. Additionally a high plateau can be seen before the auto-correlation peak in field B (samples 105 . . . 125). This effect decreases the detection performance.

The above set forth latest proposed B-FIELD and A-FIELD combination has a disadvantage that when using the new B-FIELD no optimization has to be made in the A-FIELD in order to prove the auto-correlation properties of the corresponding receiver synchronization. The sequence to be used in the A-FIELD should additionally have a minimum Peak-to-Average-Power-Ratio (PAPR) and a small dynamic range (DR).

SUMMARY OF THE INVENTION

In view of the above disadvantages of the prior art, it is the object of the present invention to propose A-FIELD sequences which are optimized regarding the time domain signal properties.

It is a further object of the present invention to propose A-FIELD sequences which are optimized regarding the resulting auto-correlation based receiver synchronization characteristics when using the latest proposes B-FIELD sequence.

According to a first aspect of the present invention therefore a preamble structure for the synchronization of a receiver of a OFDM transmission system is proposed. The preamble comprises at least one first part. The at least one first part is designed f.e. for a coarse frame detection and/or a AGC control. The at least one first part contains inverse fast fourier transformed frequency domain sequences of complex symbols. The time domain signal of synchronization preamble is generated by mapping frequency domain sequences of 12 complex symbols to a 64-point IFFT according to the following scheme:

$S_{-26,26}$=sqrt(2)*{0,0,0,0,S1,0,0,0,S2,0,0,0,S3,0,0,0,S4,0, 0,0,S5,0,0,0,S6,0,0,0,S7,0,0,0,S8,0,0,0,S9,0,0,0,S10,0, 0,0,S11,0,0,0,S12,0,0,0,0}, wherein the remaining valued are set to zero.

The frequency domain sequence $S_A$ of the at least one first part (with the appropriate A-FIELD mapping as set forth above) is one of

S1 . . . S12=+A,+A,+A,+A,+A,−A,−A,+A,+A,−A,+A,−A

S1 . . . S12=+A,+A,+A,+A,−A,−A,+A,+A,−A,+A,−A,+A

S1 . . . S12=+A,+B,−A,−B,−A,−B,−A,−B,−A,+B,+A,−B

S1 . . . S12=+A,+B,−A,−B,+A,−B,+A,−B,+A,−B,−A,+B

S1 . . . S12=+A,−B,−A,+B,−A,+B,−A,+B,−A,−B,+A,+B, or

S1 . . . S12=+A,−B,−A,+B,+A,+B,+A,+B,+A,+B,−A,−B or an order reversed modification thereof.

The above sequences are also advantageous in case a preamble structure having only one part is used as the time domain signal properties are already improved by said sequences alone.

A second part (B-field) can be provided, wherein the frequency domain sequence of the at least one second part corresponds to the above captioned latest proposed B-field sequence, i.e.:

$S_B$=(1+j), (−1−j), (1+j), (−1−j), (−1−j), (1+j), (−1−j), (−1−j), (1+j), (1+j), (1+j), (1+j).

Particularly the A-field sequences

S1 . . . S12=+A,−B,−A,+B,−A,+B,−A,+B,−A,−B,+A,+B, or

S1 . . . S12=+A,−B,−A,+B,+A,+B,+A,+B,+A,+B,−A,−B or an order reversed modification thereof, in combination with said B-filed sequence result in improved autocorrelation characteristics.

The at least one second part can follow the at least one first part in the time domain.

According to a further aspect of the present invention an OFDM transmitter designed for transmitting a synchronization preamble as set forth in the BCCH channel of an OFDM system is provided.

According to a still further aspect of the present invention a method for the synchronization of a receiver of a OFDM transmission system is provided.

Further advantages, features and objects of the present invention will become evident for the man skilled in the art by means of the following description of embodiments of the present invention taken into conjunction with the figures of the enclosed drawings.

DETAILED DESCRIPTION OF THE INVENTION

The following sequence generation rules for the A-FIELD are suggested which all achieve optimum PAPR and DR. Later on a subset is used which is selected with respect to optimized auto-correlation performance in conjunction with the B-FIELD:

The use of the following A-FIELD sequences already improves the time domain signal properties (PAPR, DR, etc.):

S1 . . . S12=+A,+A,+A,+A,+A,−A,−A,+A,+A,−A,+A,−A

S1 . . . S12=+A,+A,+A,+A,−A,−A,+A,+A,−A,+A,−A,+A

S1 . . . S12=+A,+B,−A,−B,−A,−B,−A,−B,−A,+B,+A,−B

S1 . . . S12=+A,+B,−A,−B,+A,−B,+A,−B,+A,−B,−A,+B

S1 . . . S12=+A,−B,−A,+B,−A,+B,−A,+B,−A,−B,+A,+B

S1 . . . S12=+A,−B,−A,+B,+A,+B,+A,+B,+A,+B,−A,−B with A=exp(j*2*π*$\phi_A$) and $$B = A * \exp\left(j\frac{\pi}{2}\right) = \exp\left(j2\pi * \varphi_A + j\frac{\pi}{2}\right)$$

and 0.0≦$\phi_A$<1.0.

More sequences can be generated by reversing the sequence order, this means replace S1 by S12, replace S2 by S11, . . . , replace S12 by S1. Note that the first two sequence kernels are binary, the rest are quaternary sequence kernels.

These sequences are advantageous also in case a preamble with only one part is used.

The following sequences which are a subset of the above A-FIELD sequences are advantageous in combination with the latest proposed B-Filed sequence regarding the resulting autocorrelation properties:

The following first sequence is especially suitable to be used in field A (with the already explained mapping):

S1 ... S12=(−1+j), (+1+j), (+1−j), (−1−j), (−1+j), (−1−j), (−1+j), (−1−j), (−1+j), (−1−j), (+1−j), (+1+j).

The following second sequence that is especially suitable to be used in field A is (with the already explained mapping):

S1 ... S12=(+1−j), (−1+j), (+1−j), (−1+j), (−1+j), (+1−j), (+1−j), (−1+j), (−1+j), (−1+j), (−1+j), (−1+j).

This second sequence is especially attractive as it uses only a binary alphabet $(\pm 1)*(+1-j)$.

AC Performance of the Modified BCCH Preamble (First New Proposal for the A-field)

The negative effect shown in FIG. 4 can be avoided if the new proposed sequence is used in the A-FIELD. An optimized matching between A and B-FIELD of the BCCH preamble is achieved and thus the timing accuracy improvement, which is basically achieved through the specified time domain structure, is kept. Two clear single AC amplitude peaks can be identified in the BCCH preamble if the new proposed sequence is used for the generation of the A-FIELD (see FIG. 5).

Figure 5:
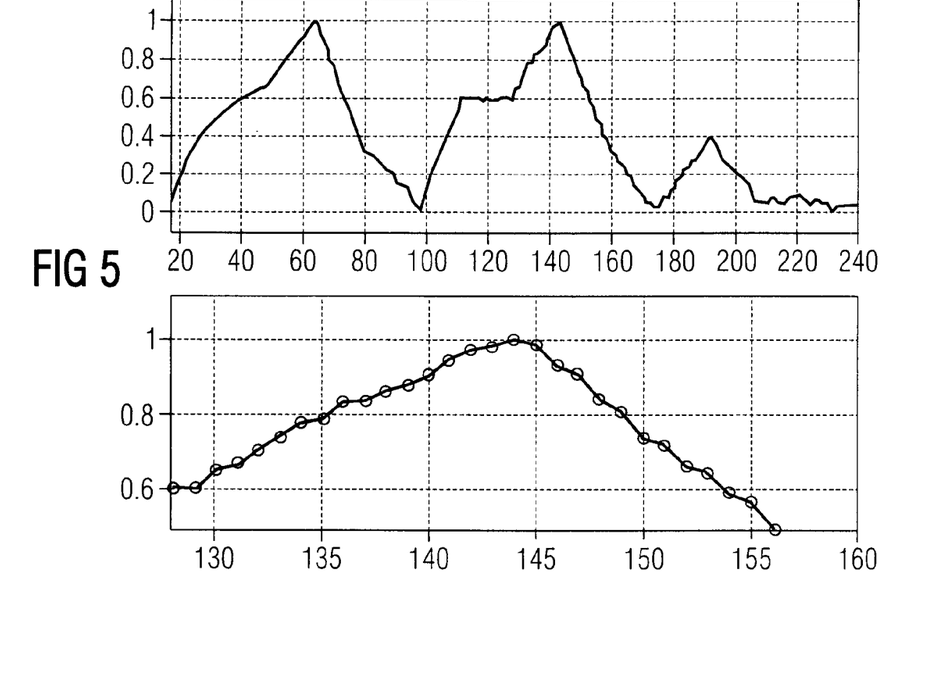
FIG. 5 shows the auto-correlation performance when using a first modified BCCH preamble according to the present invention.

Furthermore, the slopes on both sides of the B-FIELD peak are very similar (similar gradient on the right and left side of the B-FIELD auto-correlation peak), this effect increases the synchronization accuracy significantly. Additionally a lower plateau can be seen before the AC amplitude peak in field B (samples 110 ... 130). This effect increases the detection performance, as the plateau-value can be used as a threshold to activate a correlation-peak position detector.

One advantage of this sequence is that both auto-correlation peaks have a very similar shape.

AC Performance of the Modified BCCH Preamble (Second New Proposal for the A-field)

An optimized matching between A and B-FIELD of the BCCH preamble is achieved and thus the timing accuracy improvement, which is basically achieved through the specified time domain structure, is kept. Two clear single AC amplitude peaks can be identified in the BCCH preamble if the new proposed sequence is used for the generation of the A-FIELD (see FIG. 6).

Figure 6:
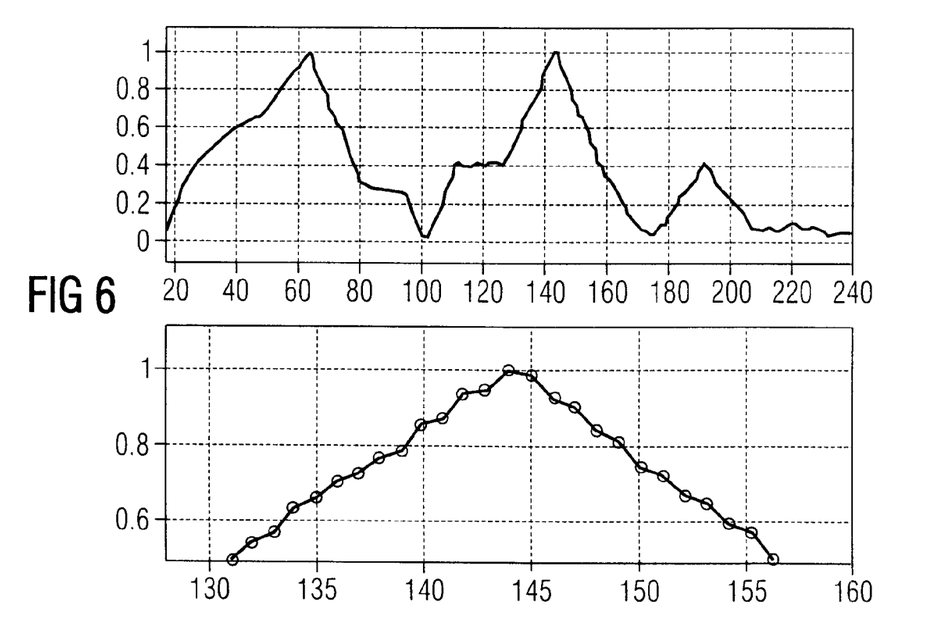
FIG. 6 shows the auto-correlation performance of a modified BCCH preamble according to another embodiment of the present invention.

Furthermore, the slopes on both sides of the B-FIELD peak are very similar (similar gradient on the right and left side of the B-FIELD auto-correlation peak), this effect increases the synchronization accuracy significantly. Additionally a lower plateau can be seen before the AC-amplitude peak in field B (samples 110 ... 130). This effect increases the detection performance, as the plateau-value can be used as a threshold to activate a correlation-peak position detector.

In this case the plateau is even lower as in the first modification and the second auto-correlation peak is very sharp.

Time Domain Signal Properties

For OFDM (or in general multicarrier signals) the signal envelope fluctuation (named Peak-to-Average-Power-Ratio=PAPR) is of great concern. A large PAPR result in poor transmission (due to nonlinear distortion effects of the power amplifier) and other signal limiting components in the transmission system (e.g. limited dynamic range of the AD converter). For synchronization sequences it is even more desirable to have signals with a low PAPR and low dynamic range in order to accelerate the receiver AGC (automatic gain control) locking and adjusting the reference signal value for the A/D converter (the whole dynamic range of the incoming signal should be covered by the A/D converter resolution without any overflow/underflow).

Currently Proposed Preamble

Figure 7:
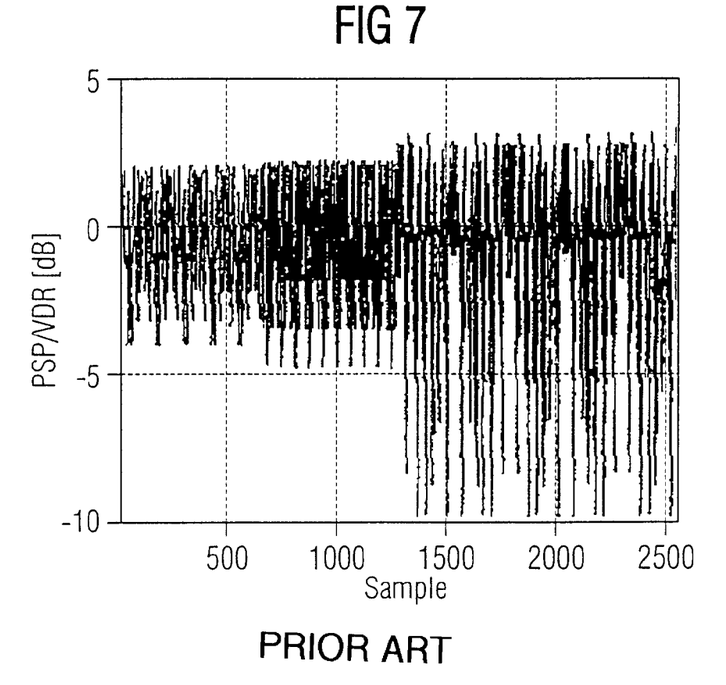
FIG. 7 shows a time domain signal (power) of the known preamble.

FIG. 7 shows the time domain power envelope of the resulting time domain signal for the preamble. The three different fields are clearly visible. Field A and field B have been optimized with respect to the PAPR and DR. 8-times oversampling was considered in order to ensure the peaks were captured correctly.

Preamble With New Proposed A-FIELD and Modified B-FIELD

The synchronization sequence design and preamble structure proposed improve the timing detection due to the joint design/optimization of the A-FIELD and the B-FIELD. However, PAPR and DR properties should not be degraded.

Figure 8:
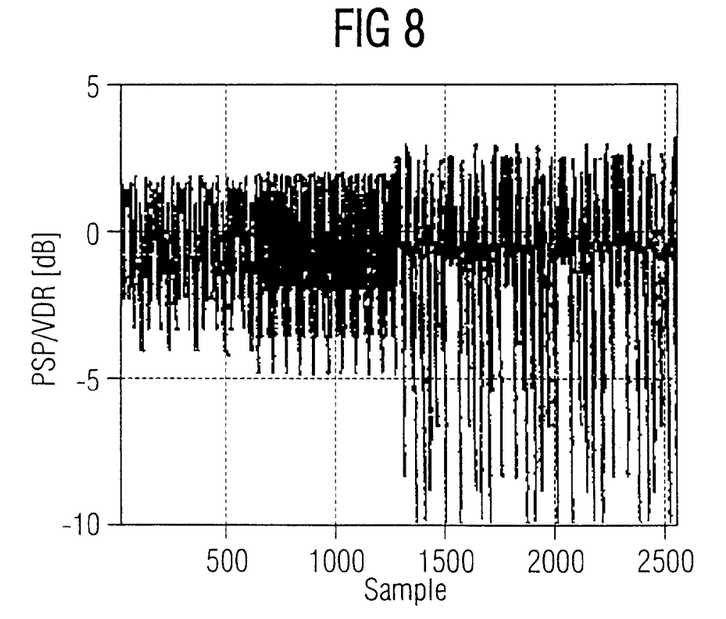
FIG. 8 shows the time domain signal achieved by means of a modified A-FIELD according to the present invention.
Figure 9:
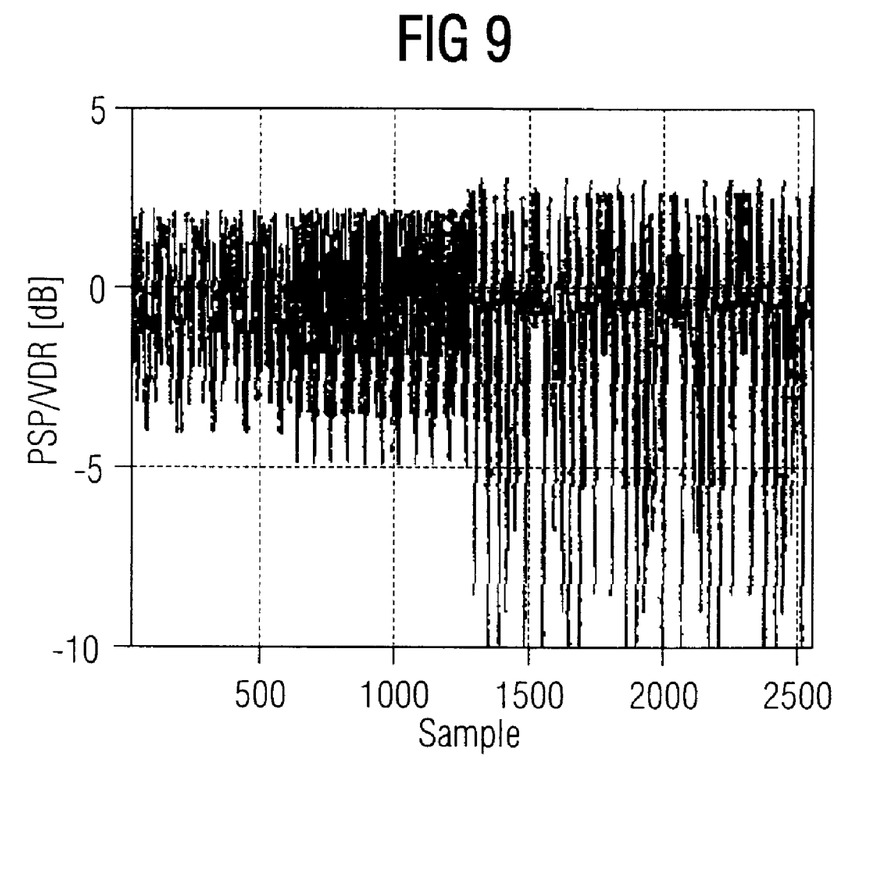
FIG. 9 shows the time domain signal (power) achieved by means of a modified A-FIELD according to another embodiment of the present invention.

In FIGS. 8 and 9 the two different A-FIELD options and the modified B-FIELD is used and the C-FIELD is maintained. As can be seen there is no degradation with respect to PAPR and DR.

FIG. 8 shows the time domain signal (power) of the preamble with modified A-FIELD (first A proposal)

FIG. 9 shows the time domain signal (power) of the preamble with modified A-field (second A proposal).

The proposal is based on the synchronization and training preambles that are already specified. Optimized sequence are proposed, which are very suitable to generate a preamble or a part (also called field) of it by mapping the sequence to the appropriate subcarriers of an OFDM symbol with a IFFT size of 64. The properties of the proposed sequence with respect to PAPR and dynamic range are equal to the properties of all currently specified sequences.

The new proposed sequences can be especially used for the generation of the A-field of the BCCH preamble, because this new sequence is properly matched to the specified sequence in the B-field of the BCCH preamble. The benefit of our proposal is the improved timing accuracy when the AC result in the B-field of the BCCH preamble is used for synchronization. The time domain structures of the preambles as specified are not touched by this proposal.

Summary of the Advantages

An OFDM based SYNCH symbol is proposed with a reduced Peak-to-Average-Power-Ratio (PAPR)

Improved synchronization performance (timing accuracy compared to current specified preamble) is achieved No modification of the specified time domain preamble structures is necessary No extra complexity is needed This proposal therefore describes an optimized synchronization (SYNCH) symbol sequence to be used in transmission systems, which are currently under standardization. The synchronization symbol is constructed using specially designed OFDM (orthogonal frequency division multiplexing) symbols with an optimized sequence, which is mapped onto the modulated subcarriers. The resulting synchronization symbol consists of several repetitions in the time domain. Using the proposed sequence the resulting synchronization symbol achieves a high timing detection and frequency offset estimation accuracy.

Furthermore the burst is optimized to achieve a very low envelope fluctuation (low Peak-to-Average Power Ratio) and a very low dynamic range to reduce complexity on the receiver and to save time and frequency acquisition time in the receiver. The proposed sequence is specifically optimized with respect to all other synchronization symbols that are used to construct the synchronization and training preambles for the BCCH-DLCHs.

What is claimed is:

1. A method of generating a synchronization preamble signal for a Broadcast (BCCH) channel of an OFDM system, the method comprising the steps of:

generating OFDM symbols by modulating the subcarriers $S_{-26,26}$ of the OFDM symbol as follows:

$S_{-26,26}$={0,0,0,0,S1,0,0,0,S2,0,0,0,S3,0,0,0,S4,0,0,0,S5, 0,0,0,S6,0,0,0,S7,0,0,0,S8,0,0,0,S9,0,0,0,S10,0,0,0, S11,0,0,0,S12,0,0,0,0);

generating a time domain signal of the first part (A-FIELD) of the preamble signal by inverse Fast Fourier Transforming OFDM symbols;

the preamble signal being characterized in that the frequency domain sequence S1 . . . S12 of the modulated subcarriers of the first part (A-FIELD) is:

S1 . . . S12=+A,+A,+A,+A,+A,−A,−A,+A,+A,−A,+A, −A;

S1 . . . S12=+A,+A,+A,+A,−A,−A,+A,+A,−A,+A,−A, +A;

S1 . . . S12=+A,+B,−A,−B,−A,−B,−A,−B,−A,+B,+A, −B;

S1 . . . S12=+A,+B,−A,−B,+A,−B,+A,−B,+A,−B,−A, +B;

S1 . . . S12=+A,−B,−A,+B,−A,+B,−A,+B,−A,−B,+A, +B;

S1 . . . S12=+A,−B,−A,+B,+A,+B,+A,+B,+A,+B,−A, −B; or an order reversed modification thereof in which the values of S1 to S6 are swapped with S12 to S7, respectively, such that S1 is replaced by S12, S2 is replaced by S11, . . . , and S12 is replaced by S1, wherein:

$A=\exp(j*2*\pi*\phi_A)$, $B=A*\exp(j*\pi/2)$, and $0 \leq \phi_A \leq 1$.

2. A method of synchronizing a receiver of an OFDM transmission system, the method comprising the steps of:

receiving a preamble structure signal; and autocorrelating the received preamble structure signal;

wherein the preamble structure signal comprises at least one first part (A-FIELD) which time domain signal is generated by inverse Fast Fourier Transforming OFDM symbols generated by modulating the subcarriers $S_{26,26}$ of the OFDM symbol as follows:

$S_{-26,26}$={0,0,0,0,S1,0,0,0,S2,0,0,0,S3,0,0,0,S4,0,0,0,S5, 0,0,0,S6,0,0,0,S7,0,0,0,S8,0,0,0,S9,0,0,0,S10,0,0,0, S11,0,0,0,S12,0,0,0,0};

the preamble signal being characterized in that the frequency domain sequence S1 . . . S12 of the modulated subcarriers of the at least one first part (A-FIELD) is:

S1 . . . S12=+A,+A,+A,+A,+A,−A,−A,+A,+A,−A,+A, −A;

S1 . . . S12=+A,+A,+A,+A,−A,−A,+A,+A,−A,+A,−A, +A;

S1 . . . S12=+A,+B,−A,−B,−A,−B,−A,−B,−A,+B,+A, −B;

S1 . . . S12=+A,+B,−A,−B,+A,−B,+A,−B,+A,−B,−A, +B;

S1 . . . S12=+A,−B,−A,+B,−A,+B,−A,+B,−A,−B,+A, +B;

S1 . . . S12=+A,−B,−A,+B,+A,+B,+A,+B,+A,+B,−A, −B; or an order reversed modification thereof in which the values of S1 to S6 are swapped with S12 to S7, respectively, such that S1 is replaced by S12, S2 is replaced by S11, . . . , and S12 is replaced by S1, wherein:

$A=\exp(j*2*\pi*\phi_A)$, $B=A*\exp(j*\pi/2)$, and $0 \leq \phi_A < 1$.

* * * * *